W. V. TURNER.
EXHAUST CONTROL VALVE FOR AIR BRAKES.
APPLICATION FILED JULY 16, 1907.
1,027,937.
Patented May 28, 1912.
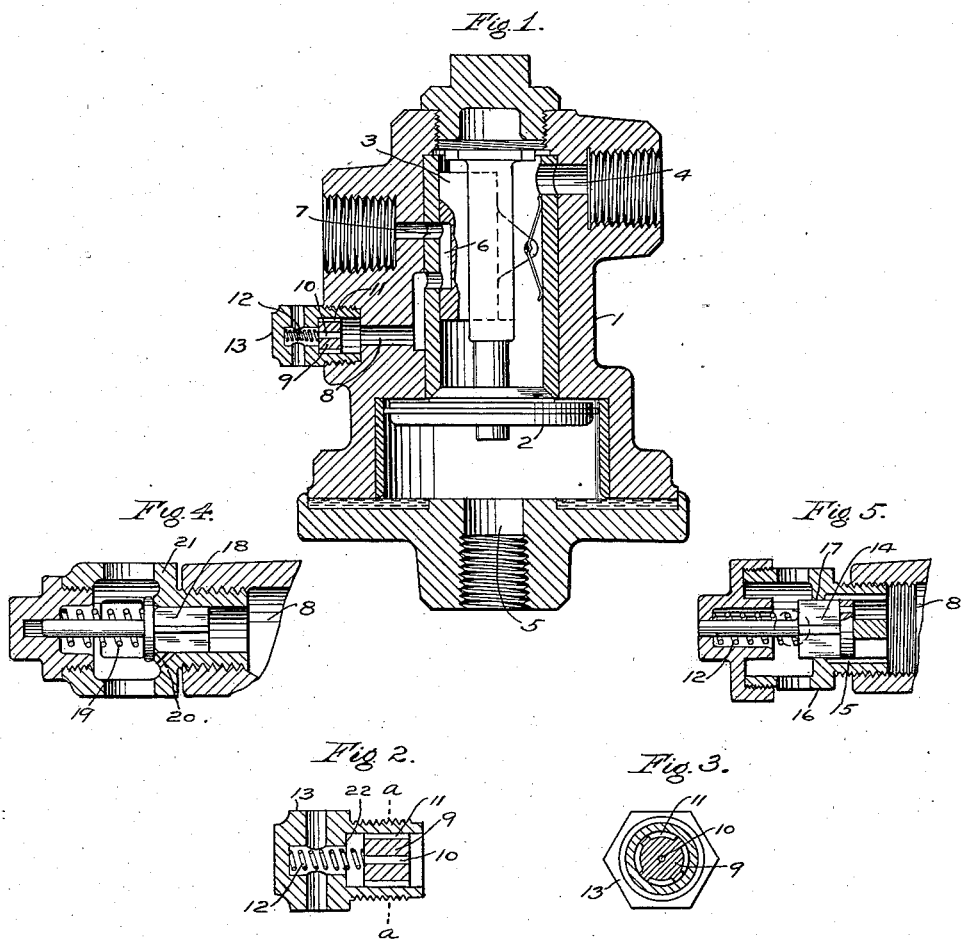
WITNESSES
INVENTOR
Walter V. Turner
by E. Wright Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

EXHAUST-CONTROL VALVE FOR AIR-BRAKES.

1,027,937.      Specification of Letters Patent.      Patented May 28, 1912.

Application filed July 16, 1907. Serial No. 384,108.

*To all whom it may concern:*

Be it known that I, WALTER V. TURNER, a citizen of the United States, residing at Edgewood, in the county of Allegheny and State of Pennsylvania, have invented new and useful Improvements in Exhaust-Control Valves for Air-Brakes, of which the following is a specification.

This invention relates to fluid pressure brakes and particularly to means for governing the rate of release of fluid under pressure from the brake cylinder.

With the ordinary standard air brake apparatus, especially on long trains, the release of fluid under pressure from the brake cylinders after an application of the brakes is apt to be more or less irregular, thereby causing sudden readjustments of the slack throughout the train, which produces undesirable shocks, as well known. This difficulty has been obviated to a certain extent by throttling or restricting the triple valve exhaust port, but the means heretofore employed for this purpose, a fixed plug having a restricted passage therethrough, necessarily impedes the exhaust of air from the brake cylinder throughout the release period.

The principal object of my invention is to provide improved means for temporarily retarding the release of fluid from the brake cylinder, or in other words, means adapted to secure a rapid release of fluid at one time and a slow or retarded release at another time.

In the accompanying drawings; Figure 1 is a central sectional view of a triple valve device, with one form of my invention applied; Fig. 2 a sectional view of the release valve shown in Fig. 1, showing the valve in normal position; Fig. 3 a sectional view of said valve on line *a—a* of Fig. 2; Fig. 4 a sectional view of a slightly different form of release valve and Fig. 5 still another form of release valve.

The valve for controlling the release of fluid from the brake cylinder may be connected in any desired manner to the exhaust from the brake cylinder, but a preferred construction is shown in Fig. 1, in which a valve casing 13 is screwed into the usual exhaust passage 8 of the triple valve casing 1, which contains as usual, the triple valve piston 2 and main slide valve 3. In this instance, the release valve 9 is provided with a restricted passage 10 and large passages 11, and is adapted, when seated on an outer seat 22, to close communication through said passages 11, a spring 12 being provided, which normally holds the valve from its seat.

On releasing the brakes after an application, the usual exhaust cavity 6 in the main slide valve connects the brake cylinder port 7 with the exhaust passage 8, and the fluid from the brake cylinder flowing through said passage 8, moves the valve 9 to its seat, closing the large exhaust passages 11. The fluid can then only escape through the restricted passage 10, so that the release of fluid is retarded. The fluid pressure having been reduced to substantially that of the spring 12, the valve 9 returns to its normal open position, permitting a full and rapid exhaust of the fluid then remaining in the brake cylinder. The spring 12 may, of course, be adjusted to open at any desired degree of brake cylinder pressure.

In Fig. 5 is illustrated another form of release valve 14, having a piston portion 15, which, in the outer position of the valve, closes communication between the passage 8 and the exhaust, the casing 16 being provided with a reduced cylindrical part 17, for this purpose. It will be apparent that the operation of this form of release valve is similar to that shown in Fig. 1.

The temporary retardation of the exhaust permits the auxiliary reservoir to be recharged without entirely releasing the brakes, and more particularly for this purpose, my invention may be constructed as shown in Fig. 4. In this instance, the release valve 18 is normally seated by a spring 19, and a restricted exhaust passage 20 is provided in the valve casing 21. With this form, the release valve 18 opens to its full extent primarily, on release of fluid from the brake cylinder thereto, and as the pressure diminishes the valve closes and the remaining fluid escapes slowly through the restricted exhaust passage 20.

It will now be apparent that I have provided a simple and inexpensive means for regulating the release of fluid from the brake cylinder which may be easily applied to the usual triple valve, or connected otherwise to the exhaust port thereof.

Having now described my invention, what

I claim as new and desire to secure by Letters Patent is:—

1. A valve device for retarding the release of the brakes comprising a valve piston provided with ports through which air is released from the brake cylinder and having a seated position for closing one or more of said ports, said valve piston being moved to its seated position by the brake cylinder pressure.

2. A valve device for retarding the release of the brakes comprising a valve piston provided with ports through which air is released from the brake cylinder and having a seated position for closing one or more of said ports and a spring for normally holding said valve piston away from its seat, said valve piston being moved to its seated position according to the degree of brake cylinder pressure.

In testimony whereof I have hereunto set my hand.

WALTER V. TURNER.

Witnesses:
R. F. EMERY,
WM. M. CADY.